Figure 1:
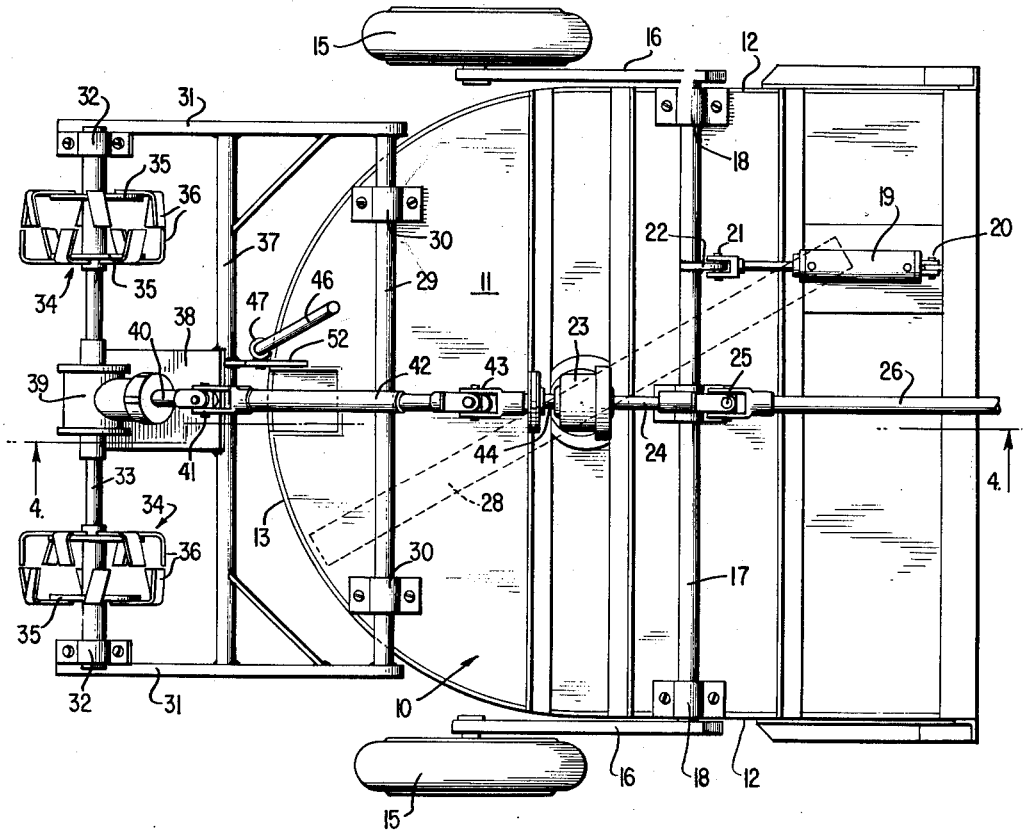

May 19, 1964    F. C. CALDWELL    3,133,598
MACHINE FOR CUTTING AND SHREDDING ABOVE-GROUND PLANT GROWTH AND
FOR TILLING THE SOIL AND SHREDDING PLANT ROOTS
Filed April 1, 1963    2 Sheets-Sheet 1

INVENTOR.
F. C. CALDWELL
BY
*B. P. Fishleman, Jr.*
ATTORNEY

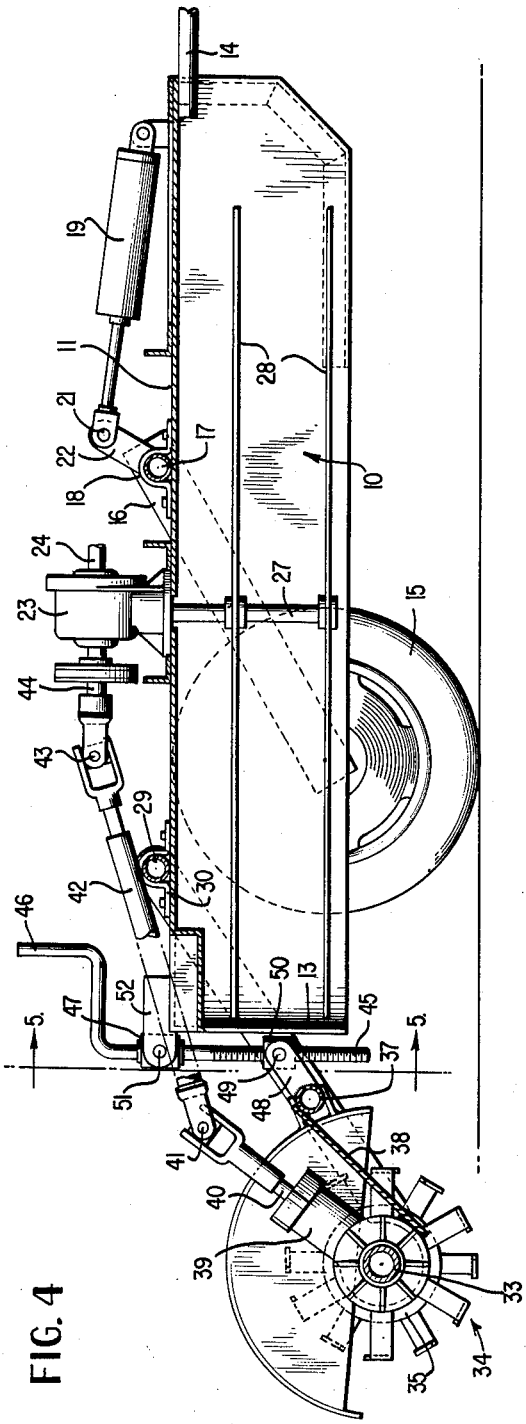

United States Patent Office 3,133,598
Patented May 19, 1964

3,133,598
MACHINE FOR CUTTING AND SHREDDING ABOVE-GROUND PLANT GROWTH AND FOR TILLING THE SOIL AND SHREDDING PLANT ROOTS
Frederick Clay Caldwell, Corpus Christi, Tex., assignor to E. L. Caldwell & Sons, Inc., Corpus Christi, Tex., a corporation of Texas
Filed Apr. 1, 1963, Ser. No. 269,389
4 Claims. (Cl. 172—51)

This invention relates broadly to agricultural machinery and more particularly to a machine for cutting and shredding above-ground plant growth, such as cotton stalks and the like, and for simultaneously cutting and shredding the roots of the plant growth and tilling the soil in the rows having the plant growth.

More particularly, the machine embodies a leading power-driven cutter of either the vertical or horizontal axis type for thoroughly cutting and shredding above-ground growth and stalks, and trailing power-driven tilling implements which may travel directly on the rows to cultivate the soil and to thoroughly break-up, cut and shred the roots of the plant growth to aid in the decomposition thereof and thereby eliminate the subsequent clogging of planters, cultivators, fertilizer attachments and the like. The machine assures that the roots are chopped into very small pieces so that they will rot readily even in regions where little moisture is present in the ground. The machine is particularly advantageous when used in regions where the farmer wishes to double crop his land and where it is necessary, as soon as one crop is harvested, to fully prepare the land for the planting of the second crop. While above-ground stalk cutters are known and various types of power-driven tillers are also known, there is no available equipment for accomplishing the combined function of the present machine, which machine is highly compact and fully adjustable to provide the desired above-ground cutting as well as tilling and root shredding at the desired depth below-ground and directly on the rows of cotton plants or the like.

An object of the invention is to provide a machine of the mentioned character adapted to be drawn and powered by a farm tractor and including interconnected gearing for operating the above-ground cutter means and the rotary tiller means.

A further object is to provide separate and independent means for vertically adjusting the above-ground cutter and the tilling means to meet the requirements of a given operation.

Another object is to provide a machine whose operation will aid in the control and elimination of the pink boll worm by destroying the root habitat of the worm while simultaneously clearing the ground of brush, plant stalks and the like.

Still another object is to provide a machine which is rugged and durable, reliable and efficient in operation, and economical to manufacture and maintain because of its simplicity of design.

Other objects and advantages of the invention will be apparent during the course of the following detailed description.

Figure 2:
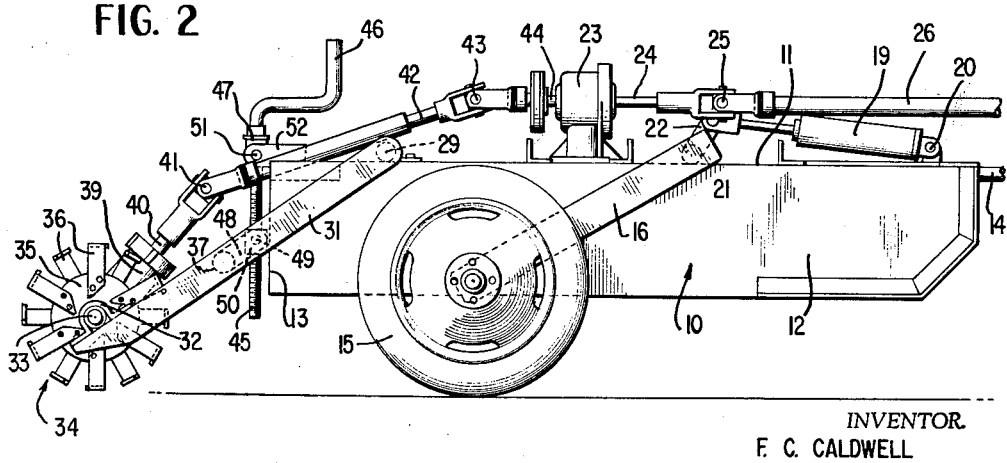

In the accompanying drawings forming a part of this application and in which like numerals are employed to designate like parts throughout the same, FIGURE 1 is a top plan view of a combined stalk cutter, tiller and root shredder according to a preferred embodiment of the invention, FIGURE 2 is a side elevation of the same, FIGURE 3 is a rear elevation of the machine, FIGURE 4 is a longitudinal vertical section taken on line 4—4 of FIGURE 1, and FIGURE 5 is a fragmentary vertical section taken on line 5—5 of FIGURE 4.

In the drawings, wherein for the purpose of illustration is shown a preferred embodiment of the invention, the numeral 10 designates a body portion or housing which is forwardly and downwardly open and which includes a flat horizontal top wall 11 and relatively shallow longitudinal side walls 12 and a curved rear wall 13, as shown. The forward end of the housing 10 has a suitable tongue 14 rigid therewith adapted for connection with the drawbar of a farm tractor or like towing vehicle.

The housing 10 is supported by ground-engaging side wheels 15, journaled on vertically swingable arms 16 close to the sides of the housing 10. The tops of the arms 16 are rigidly interconnected by a transverse rock shaft 17 lying close to the top of the housing and held within bearings 18, rigidly mounted directly upon the top wall of the housing near opposite sides thereof and near the longitudinal center of the housing. A conventional fluid pressure operated cylinder piston unit 19 is preferably provided with the forward end thereof pivoted as at 20 to the housing 10 and with the rear end of the piston rod pivoted at 21 to a crank extension 22 on the rock shaft 17. By this means, the wheels 15 may readily be adjusted vertically so that the housing and its cutter means to be described may be positioned at the desired height above the ground. If preferred, a manual crank means may be employed in lieu of the unit 19 to adjust the wheels and housing vertically.

Mounted atop the housing 10 centrally is a first gear box 23 containing conventional bevel gears or the like and having a forward longitudinal input drive shaft 24 equipped with a universal joint 25 connected with a forwardly extending drive shaft 26 adapted to be driven by a rotary power take-off shaft of the tractor. The gear box 23 has a vertical depending cutter shaft 27 upon which is rigidly mounted a pair of vertically spaced horizontal rotary cutter blades 28 which operate within the confines of the housing 10 to cut and thoroughly shred above-ground stalks, brush and other growth. If preferred, only a single cutter blade 28 may be employed or three or more cutter blades, if desired.

In place of the vertical axis horizontally rotating cutter blades 28, the machine can easily be equipped with a horizontal axis rotary beater-type cutter of any desired type and the axle of such cutter can be powered at either side of the machine by a horizontal cross shaft leading from the gear box 23 and suitable gearing between this shaft and the cutter shaft on one side of the machine. While this structure is not shown in the drawings, it is contemplated within the scope of the invention.

The machine further comprises rear power-operated rotary soil tilling and below-ground root shredding means including a transverse horizontal rock shaft 29 spaced rearwardly of the rock shaft 17 and parallel thereto and held within bearings 30, rigidly secured to the top of the housing near the rear thereof. Rigid with the ends of the rock shaft 29 are parallel vertically swingable support arms 31 having bearings 32 near their rear ends for supporting a rotary cross shaft 33 having tiller and shredder implements 34 secured thereto in spaced relation to turn therewith directly upon the rows of plants or roots. Each tiller implement or unit 34 comprises a pair of spaced discs 35 rigid with the shaft 33 and a multiplicity of circumferentially spaced opposed generally L-shaped blades 36, in turn suitably rigidly secured to the discs. The units 34 may operate slightly below-ground, such as about one inch, or they may till the soil and shred roots therein to a depth of six inches or more, depending upon the adjustment of the machine in response to particular needs.

A sturdy cross brace 37 between the arms 31 is provided, FIGURE 1, to which is welded an inclined plate 38, having its lower end anchored to a rear gear box 39, housing suitable gearing to operate the shaft 33 in the desired direction. In this connection, it is contemplated according to the invention to drive the rotary tilling units 34 either in the direction of movement of the machine or reversely in some cases, and this may easily be done by rearranging the gearing in gear box 39. The gear box 39 has an upwardly directed inclined input drive shaft 40 having a universal joint 41 connected with an inclined extension drive shaft 42, connected by another universal joint 43 with an output drive shaft 44 connected with and driven by the gear box 23.

Means are provided to raise and lower the arms 31 and associated parts relative to and independently of the housing 10. Such means may comprise a vertical screw shaft 45 at the rear of housing 10 and having a crank handle 46 projecting thereabove. The shaft 45 is supported by suitable bearing means 47 on the back of the housing, as shown. An arm extension 48 rigid with the cross brace 37 is pivoted at 49 to a vertically shiftable nut 50 on the vertical screw shaft 45. The upper bearing 47 is also swiveled at 51 to a bracket 52 rigid with the housing 10 at the rear and near the transverse center thereof. It may be seen that turning of the screw shaft 45 within its bearing 47 raises and lowers the nut 50 and also raises and lowers the arms 31 and the tiller unit 34 carried thereby and this adjustment is independent of the vertical adjustment means for the cutter blades 28 and associated parts. If preferred, in lieu of the manual crank adjustment for the rear tiller means, fluid pressure operated means or the like similar to the means 19 may be employed.

In view of the foregoing description and objects, the operation of the machine should be apparent to those skilled in the art. The machine provides efficiently for the once-over complete preparation of the soil prior to planting and thoroughly rids the soil of above-ground brush and stalks by cutting and shredding the same and simultaneously tills the soil along the rows where the old crops were planted and chops and thoroughly shreds the roots of the plants and aids in their decomposition rapidly after shredding. Consequently, the farmer can plant his second crop quickly after the harvesting of the first crop with the very minimum of expense, time and labor. The independent adjustments of the machine render the same highly versatile in the once-over preparation of various types of soil in various regions.

As shown in elevation in FIGURE 4 and in phantom lines in FIGURE 3, the rotary units 34 may be shielded at their tops with fenders to prevent broadcasting of soil. This is an optional feature. The fenders have been omitted from the other drawing figures for clarity.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A machine for cutting and shredding above-ground plant stalks in rows and for simultaneously shredding and disintegrating below-ground plant roots in said rows in a single once-over cultivating operation prior to immediate replanting, said machine comprising a body portion adapted to be drawn by a tractor and being of a width sufficient to span at least two adjacent rows of said plant stalks, ground-engaging wheels carrying said body portion and arranged on opposite sides thereof and outwardly of said sides and straddling said two rows and adapted to roll between adjacent rows of plant stalks, means interconnecting said body portion and wheels and operable to raise and lower the wheels to thereby adjust the elevation of the body portion relative to the ground, a vertical axis rotary above-ground cutter blade unit on said body portion including at least one substantially horizontal rotary cutter blade of a diameter sufficient to span said two rows of plant stalks for cutting and shredding the same as the machine traverses said two rows, a frame pivotally mounted upon said body portion in trailing relation thereto and being vertically swingable on a transverse horizontal axis relative to the body portion and being of a width sufficient to span said two rows transversely, separate means interconnecting said frame and body portion and operable independently of the first-named means to raise and lower said frame relative to the body portion to thereby adjust the elevation of the frame relative to the ground rearwardly of the body portion, substantially horizontal transverse rotary axis tiller means on said frame rearwardly of the body portion including spaced tiller units engaging directly upon said two rows between said wheels and rearwardly of said cutter blade unit for shredding and disintegrating below-ground roots in said two rows and for tilling the soil in said two rows, gearing on said body portion connected with said cutter blade unit to operate the same and having an input drive shaft adapted to be turned by a power take-off shaft of a tractor, and driving connecting means between said gearing and transverse rotary axis tiller means to operate the latter in unison with said cutter blade unit.

2. A machine for cutting and shredding above-ground plant stalks in rows and for substantially simultaneously shredding and disintegrating below-ground plant roots and tilling the soil in said rows in a once-over operation prior to replanting in said rows, said machine comprising a body portion adapted to be drawn by a tractor, rotary above-ground cutter means on said body portion of sufficient width to span at least two plant rows for cutting and shredding said stalks in said two rows simultaneously, means on said body portion operable to raise and lower the body portion to thereby adjust the elevation of the rotary cutter means relative to the ground, a frame pivotally mounted on said body portion in trailing relation thereto and being vertically swingable on a transverse horizontal axis relative to the body portion, separate means interconnecting said frame and body portion and operable independently of the first-named means to raise and lower the frame relative to the body portion and ground, substantially horizontal transverse rotary axis tiller means journaled on said frame rearwardly of the body portion and cutter means including spaced tiller blade units engaging directly on said two rows for shredding and disintegrating said below-ground roots in said two rows and for tilling the soil in said two rows, and means drivingly interconnecting said cutter means and rotary tiller means and mounted on said body portion, said last-named means including a drive shaft adapted to be turned by a power take-off shaft of a tractor.

3. A machine for cutting and shredding above-ground plant stalks in rows and for shredding and disintegrating below-ground plant roots and for tilling the soil in said rows in a once-over operation preparatory to replanting in said rows, said machine comprising a body portion adapted for connection with a tractor, means on said body portion operable to raise and lower the body portion with respect to the ground, vertical axis rotary above-ground cutter means on the body portion of sufficient width to span at least two of said rows for cutting and shredding said above-ground stalks in said two rows, trailing substantially horizontal transverse rotary axis tiller means movably mounted upon said body portion including transversely spaced tiller blade units engaging directly on said two rows for tilling the soil and shredding and disintegrating below-ground roots in said two rows, means separate from the first-named means on said body portion and connected with the tiller means and operable independently of the first-named means to raise and lower the tiller means relative to the ground and body portion, and means on said body portion drivingly interconnecting said cutter means and rotary tiller means and adapted to be powered by the power take-off shaft of a tractor.

4. A machine for cutting and shredding above-ground plant stalks in rows and for tilling the soil and shredding and disintegrating below-ground roots in said rows in a once-over operation preparatory to replanting in said rows, said machine comprising a body portion adapted to be drawn by a tractor, means on said body portion operable to raise and lower the body portion relative to the ground, vertical axis rotary above-ground cutter means on the body portion of sufficient width to span at least two of said rows for cutting and shredding said above-ground stalks therein, trailing vertically swingable rotary tiller means on said body portion of sufficient width to span at least two of said rows including transversely spaced rotary tiller blade units engaging directly on said two rows for tilling the soil and shredding and disintegrating below-ground roots in s... rate from the first-named means o... connected with said tiller means and ope... lower the tiller means relative to the grou... portion and to hold the tiller means in selected a... positions relative to the ground, and gearing on sa... body portion drivingly interconnecting the rotary cutter and tiller means and including an input drive shaft adapted to be coupled with the power take-off shaft of a tractor.

References Cited in the file of this patent

UNITED STATES PATENTS

| | | |
|---|---|---|
| 241,286 | Brenner et al. | May 10, 1881 |
| 1,025,961 | Clark | May 14, 1912 |
| 1,787,842 | Singleton | Jan. 6, 1931 |
| 2,514,395 | Iseman | July 11, 1950 |
| 2,612,017 | Jarmin | Sept. 30, 1952 |
| 2,781,709 | Caldwell et al. | Feb. 19, 1957 |
| 2,936,838 | Bonomo et al. | May 17, 1960 |